United States Patent
Lin et al.

(10) Patent No.: US 9,910,222 B1
(45) Date of Patent: Mar. 6, 2018

(54) MULTIMODE FIBER OPTICAL POWER SPLITTER

(71) Applicant: Lightel Technologies, Inc., Renton, WA (US)

(72) Inventors: Shyh-Chung Lin, Bellevue, WA (US); Kelvin Deray Lin, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

(21) Appl. No.: 15/597,067

(22) Filed: May 16, 2017

(51) Int. Cl.
*G02B 6/28* (2006.01)
*G02B 6/26* (2006.01)

(52) U.S. Cl.
CPC .......... *G02B 6/2817* (2013.01); *G02B 6/262* (2013.01); *G02B 6/2821* (2013.01)

(58) Field of Classification Search
CPC ..... G02B 6/2817; G02B 6/2821; G02B 6/262
See application file for complete search history.

(56) References Cited

U.S. PATENT DOCUMENTS

| | | | | |
|---|---|---|---|---|
| 4,846,543 A * | 7/1989 | Kapany | ................ | G02B 6/2817 359/900 |
| 4,993,796 A * | 2/1991 | Kapany | ................ | G02B 6/2817 250/227.11 |
| 5,854,700 A * | 12/1998 | Ota | ................ | G02B 6/12007 398/60 |
| 6,198,864 B1 * | 3/2001 | Lemoff | ............. | G02B 6/29367 385/24 |
| 8,000,358 B2 * | 8/2011 | Wang | ................... | H01S 5/4025 372/29.011 |
| 8,483,571 B2 * | 7/2013 | McColloch | .......... | G02B 6/4206 359/629 |
| 8,540,437 B2 * | 9/2013 | Lee | ...................... | G02B 6/4215 385/31 |
| 8,822,906 B2 * | 9/2014 | Yuan | ........................ | G01J 1/04 250/227.11 |
| 9,285,544 B2 * | 3/2016 | Panotopoulos | ...... | G02B 6/4231 |
| 2016/0252733 A1 * | 9/2016 | Giziewicz | ............ | G02B 27/108 250/578.1 |

\* cited by examiner

*Primary Examiner* — Ryan Lepisto
(74) *Attorney, Agent, or Firm* — Han IP Corporation; Andy M. Han

(57) ABSTRACT

A compact configuration of a multiport fiber array and a multi-surface optical lens constitutes a low modal noise multimode fiber optical power splitter. In a digital optical system, modal noise manifests itself in modal dependent intensity noise and modal dependent timing jitter. A compact two-part end coupling design improves both properties and is more cost effective, making it a suitable solution for future high bit rate optical system applications.

20 Claims, 6 Drawing Sheets

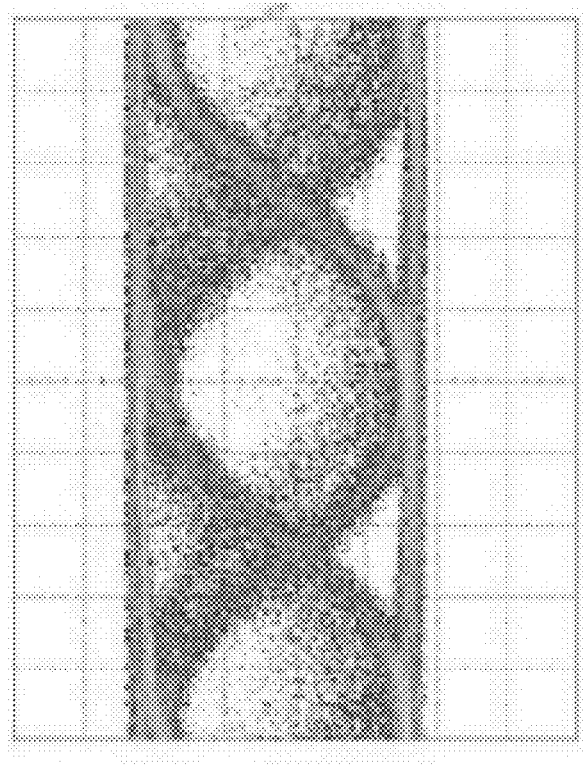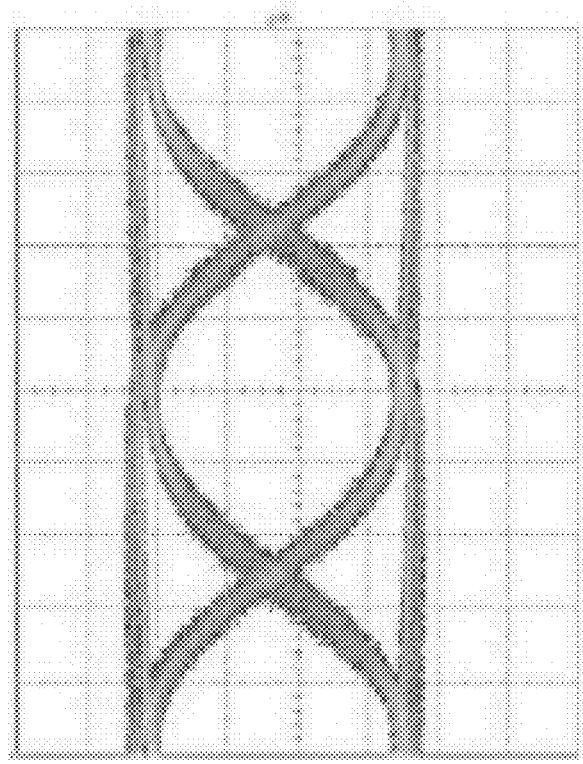
Fig. 1

MULTIMODE FIBER OPTICAL POWER SPLITTER

TECHNICAL FIELD

The present disclosure relates to fiber optics and, more specifically, to multimode fiber optical power splitters.

BACKGROUND

An optical power splitter splits incoming power into two output ports with pre-determined power ratio and is used in optical systems for signal/power distribution, monitoring, combining, and attenuation. These functions can be realized using Fused Biconical Taper (FBT), Planar Lightwave Circuit (PLC), and Micro-Optic (MO) lens/filter technologies and have found good results in single mode applications. In a multimode fiber application, the number of optical modes excited and the power distribution among them can vary wildly which results in coupling ratio and propagation time delay variation, collectively referred to as modal noise. Especially in a high bit-rate multimode fiber system, modal dependent intensity noise and modal dependent timing jitter translate into the closing of eye diagram and can significantly impact system performance.

FIG. 1 illustrates an open eye diagram versus a degraded eye diagram due to the modal dependent intensity noise and modal dependent timing jitter. The modal dependent intensity noise causes the eye diagram to compress vertically while the modal dependent timing jitter causes the eye diagram to close horizontally.

The coupling mechanism used in the realization of power splitters can be categorized into two types: a side coupling mechanism such as FBT and an end coupling mechanism such as MO. FIG. 2 illustrates the mode coupling mechanism in end coupling devices and side coupling devices. The overlap region between two mode profiles is responsible for the power coupling from one fiber to the other fiber. Since the side coupling mechanism depends on the tail region overlap of optical mode profiles, a weak coupling, it is more susceptible to modal noise. The end coupling mainly depends on the center region overlap of the mode profiles, a strong coupling mechanism, which makes it more resistive to modal noise. Power splitters that employ end coupling mechanism are less susceptive to modal dependent intensity noise and modal dependent timing jitter than splitters that use side coupling mechanism.

SUMMARY

The present disclosure pertains to compact power coupling devices having at least three ports between which a light beam may propagate, with one port designated as the launch port and the other two ports as the receiving ports. Adjacent to each port is an optical system having at least three functioning means that splits each incoming beam into two outgoing beams with a predetermined splitting ratio and directs these two beams to two respective receiving ports other than the launch port.

In a first aspect of the present disclosure, end coupling mechanism is employed to provide the optical coupling between the launch port and the receiving ports. This reduces the modal dependent intensity noise and modal dependent timing jitter.

In a second aspect of the present disclosure, a compact optical system further reduces the modal dependent timing jitter.

In a third aspect of the present disclosure, all ports are realized on a single array element with the position and orientation designed to match the optical paths afforded by the optical system.

In a fourth aspect of the present disclosure, all functioning means of the optical system are realized on a single optical element designed to match the optical paths afforded by the fiber array element.

In a fifth aspect of the present disclosure, a three port configuration forms a 1×2 splitter where one port is configured as the launch port and the other two ports as receiving ports. The optical element splits each incoming beam into two outgoing beams with a predetermined splitting ratio and directs these two beams to two respective receiving ports other than the launch port.

In a sixth aspect of the present disclosure, a four ports configuration forms a 2×2 splitter where each port can be configured as launch port and two other ports become receiving ports, a corresponding fourth port will receive no optical power and becomes an isolated port while all ports are located on the same fiber array.

In a seventh aspect of the present disclosure, multiple independent sets of these three ports configuration, one launch port and two receiving ports, are located on the same array element.

In an eighth aspect of the present disclosure, multiple independent sets of these four ports configuration, one launch port, two corresponding receiving ports, and one corresponding isolated port, are located on the same array element.

In a ninth aspect of the present disclosure, a compact power splitter consists of only two parts, one fiber array with at least three ports and one optical lens element that splits the incoming light beam and directs optical power to two respective receiving ports. This construction makes this design cost competitive compared to other alternatives.

In a tenth aspect of the present disclosure, all functioning means of the optical system are not sharing one same optical axis, but are configured on multiple optical axes.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily in scale as some components may be shown to be out of proportion than the size in actual implementation in order to clearly illustrate the concept of the present disclosure.

FIG. 1 illustrates the effect of modal noise on the eye diagram. Mode dependent intensity noise causes the eye to compress vertically while mode dependent timing jitter causes the eye to compress horizontally.

DETAILED DESCRIPTION OF PREFERRED EMBODIMENTS

The present disclosure pertains to compact multimode optical fiber power splitter devices comprised of only two optical elements, 1) a fiber array element, and 2) an optical lens element. The fiber array element has at least three ports between which a light beam may propagate with one port designated as the launch port and the other two ports as the receiving ports. Adjacent to each port is the optical lens element having at least three functioning means that splits each incoming beam into two outgoing beams with a pre-determined splitting ratio and directs these two beams to two respective receiving ports other than the launch port. Since light is reversible, light beam propagates in the reverse direction follows the same path as it is in the forward direction.

Embodiment 1

Figure 2:
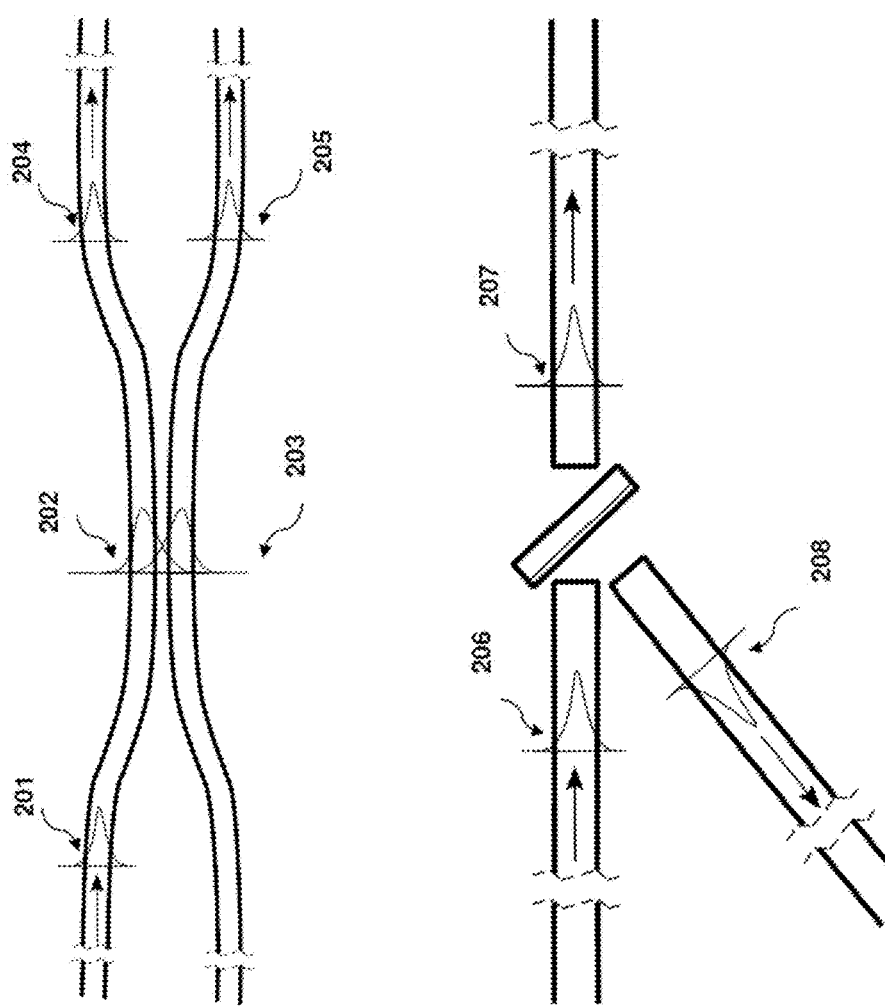
FIG. 2 is a diagram comparing two power splitter coupling mechanisms: side coupling and end coupling. The overlap region in mode profile is where optical power jumps from one port to the other. In a side coupling case, the small magnitude of mode profile overlap at the tail region makes side coupling a weaker coupling mechanism and thus more susceptible to modal noise. In an end coupling case, the optical mode profiles overlap in the mode center region makes end coupling a stronger coupling mechanism and thus more resistive to modal noise.
Figure 3:
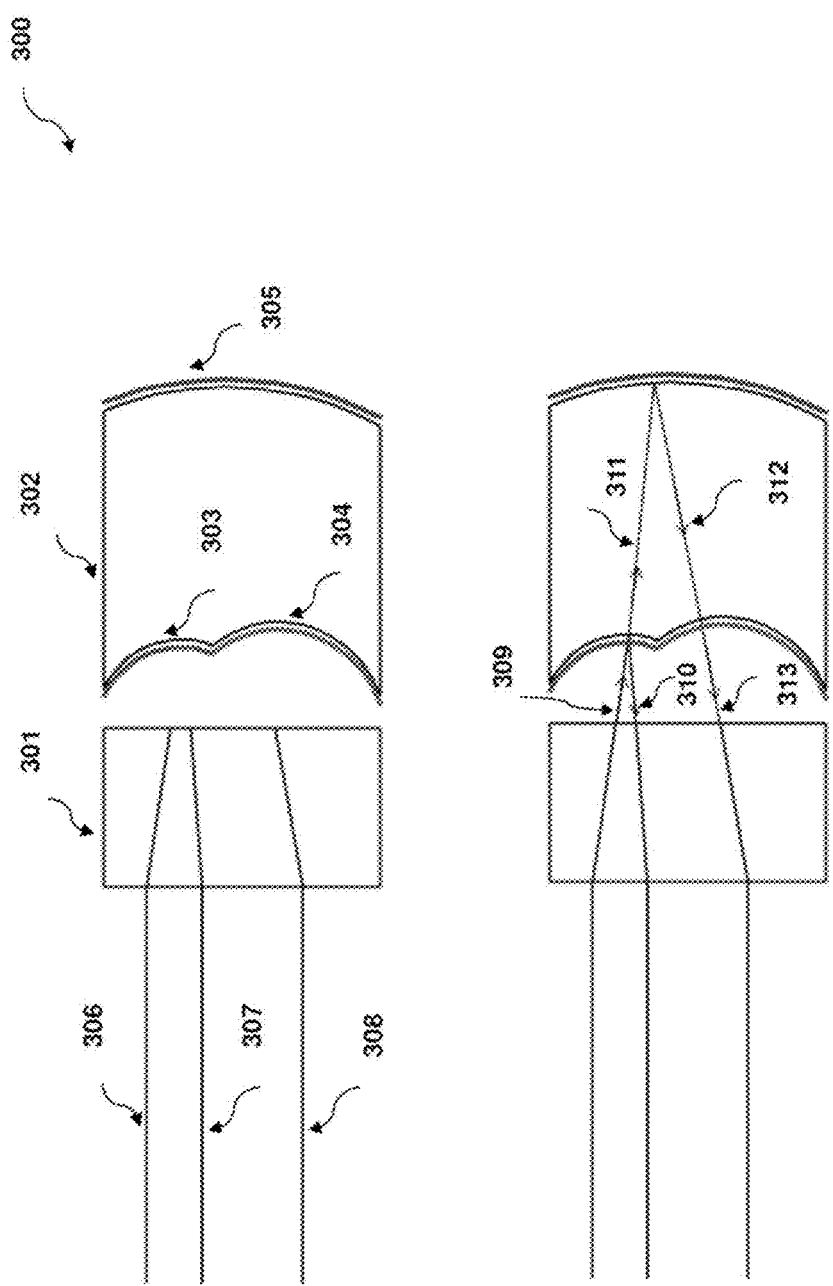
FIG. 3 is a diagram showing the configuration of a 1×2 compact power splitter comprising of two parts: one optical fiber array element and one optical lens element. Also shown are the light beams propagation between launch port and two receiving ports.

In Embodiment 1, referring to FIG. 3, an optical power splitter includes a fiber array element 301 and an optical lens element 302. The fiber array element includes three optical ports 306, 307 and 308, where port 306 is designated as launch port and ports 307, 308 are receiving ports. The optical lens element includes three functional means 303, 304, 305 where 303 is a partial reflector, 304 is an anti-reflecting surface, and 305 is a total reflector. Two elements, 301 and 302, together function as a 1×2 power splitter. Upon inputting optical beam into fiber port 306 from the far end, optical beam 309 emits from port 306 and splits into optical reflected beam 310 and optical transmitted beam 311 at partial reflector 303. The reflected beam 310 reflects off partial reflector 303 and is collected by receiving port 307 due to the lens geometry of partial reflector 303. The transmitted beam, 311, bounces off total reflector 305, as beam 312, and transmits through anti-reflecting surface 304, as beam 313, and is collected by receiving port 308; thus, accomplishing the 1×2 splitter. The optical, geometrical properties, positions and curvatures, of surfaces 303, 304, and 305 are designed to provide the splitting ratio and coupling efficiency from launch port 306 to receiving ports 307, 308 respectively.

Embodiment 2

Figure 4:
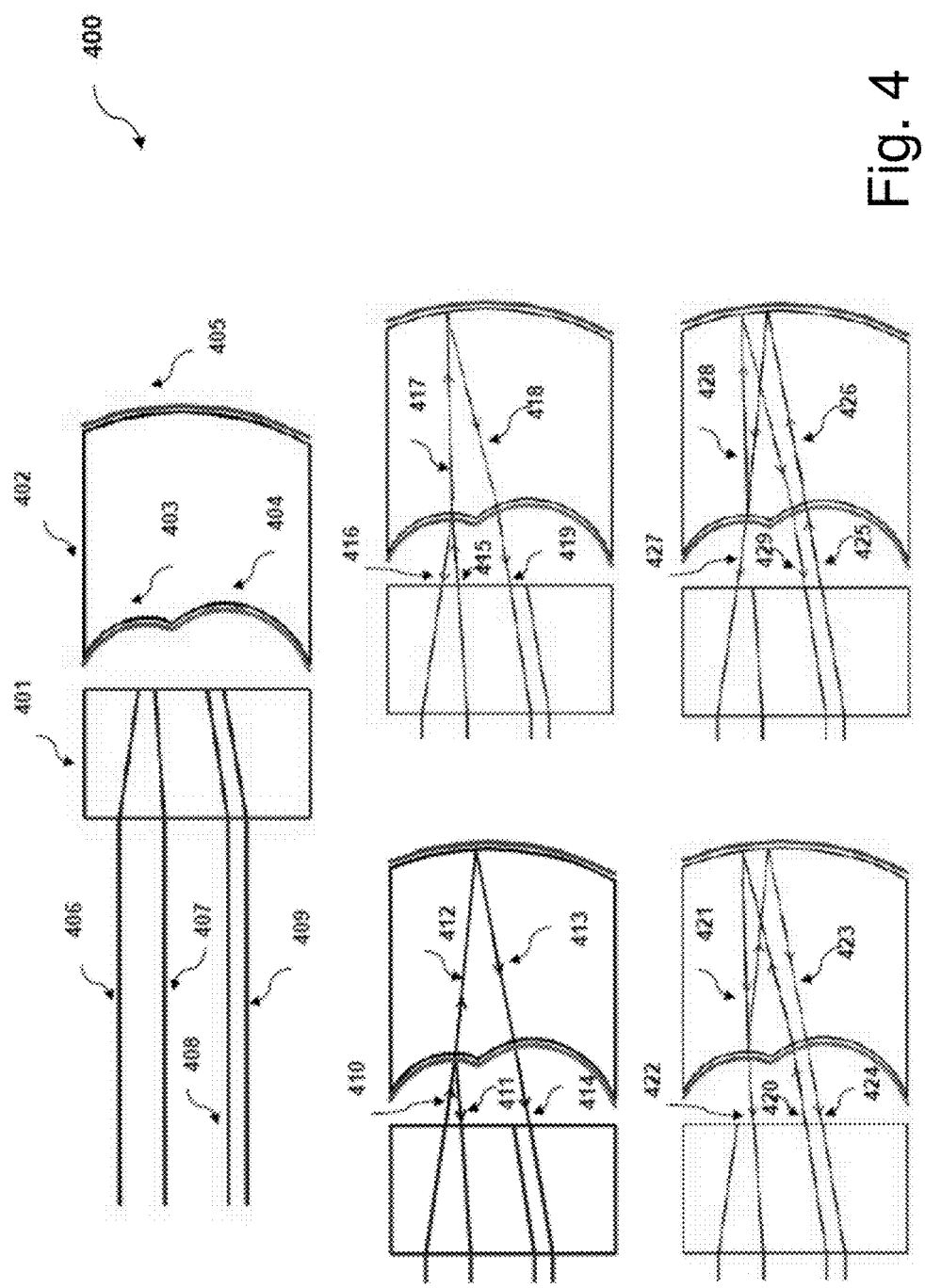
FIG. 4 is a diagram showing the light beams propagation between launch port and two receiving ports in a 2×2 splitter configuration; also shown is an isolated port for the respective launch port.

In Embodiment 2, referring to FIG. 4, an optical power splitter includes a fiber array element 401 and an optical lens element 402. The fiber array element includes four optical ports 406, 407, 408, 409 and the optical lens element includes three functional means 403, 404, 405 where 403 is a partial reflector, 404 is anti-reflecting surface, and 405 is a total reflector. Embodiment 2 differs from embodiment 1 in that there are four ports in fiber array element 401; as a result, any port can be the launch port and two corresponding ports are receiving ports and the fourth port is the isolation port, the two elements 401 and 402 together function as a 2×2 power splitter.

Upon inputting an optical beam into fiber port 406 from the far end, optical beam 410 emits from port 406 and splits into optical reflected beam 411 and optical transmitted beam 412 at partial reflector 403. The reflected beam 411 reflects off partial reflector 403 and is collected by receiving port 407 due to the lens geometry of partial reflector 403. The transmitted beam 412 bounces off total reflector 405, as beam 413, and transmits through anti-reflecting surface 404, as beam 414, and is collected by receiving port 409.

Upon inputting an optical beam into fiber port 407 from the far end, optical beam 415 emits from port 407 and splits into optical reflected beam 416 and optical transmitted beam 417 at partial reflector 403. The reflected beam 416 reflects off partial reflector 403 and is collected by receiving port 406 due to the lens geometry of partial reflector 403. The transmitted beam 417 bounces off total reflector 405, as beam 418, and transmits through anti-reflecting surface 404, as beam 419, and is collected by receiving port 408.

Upon inputting an optical beam into fiber port 408 from the far end, optical beam 420 emits from port 408, passes through anti-reflecting surface 404 and bounces off total reflector 405, as beam 421, and splits into optical transmitted beams 422 and optical reflected beam 423 at partial reflector 403. The transmitted beam 422 is collected by receiving port 407 due to the lens geometry of partial reflector 403. The reflected beams 423 bounces off total reflector 405, and transmits through anti-reflecting surface 404, as beam 424, and is collected by receiving port 409.

Upon inputting an optical beam into fiber port 409 from the far end, optical beam 425 emits from port 409, passes through anti-reflecting surface 404 and bounces off total reflector 405, as beam 426, and splits into optical transmitted beams 427 and optical reflected beam 428 at partial reflector 403. The transmitted beam 427 is collected by receiving port 406 due to the lens geometry of partial reflector 403. The reflected beam 428 bounces off total reflector 405 and transmits through anti-reflecting surface 404, as beam 429, and is collected by receiving port 408.

The description above completes the working principle of the 2×2 optical power splitter. The optical, geometrical properties, positions and curvatures, of surfaces 403, 404, and 405 are designed to provide the splitting ratio and coupling efficiency from each of the launch port 406/407/408/409 to the corresponding receiving ports (407, 409)/(406, 408)/(409, 407)/(408, 406) respectively; the fourth port 408/409/406/407 does not receive any optical beam and remains as an isolation port.

Embodiment 3

Figure 5:
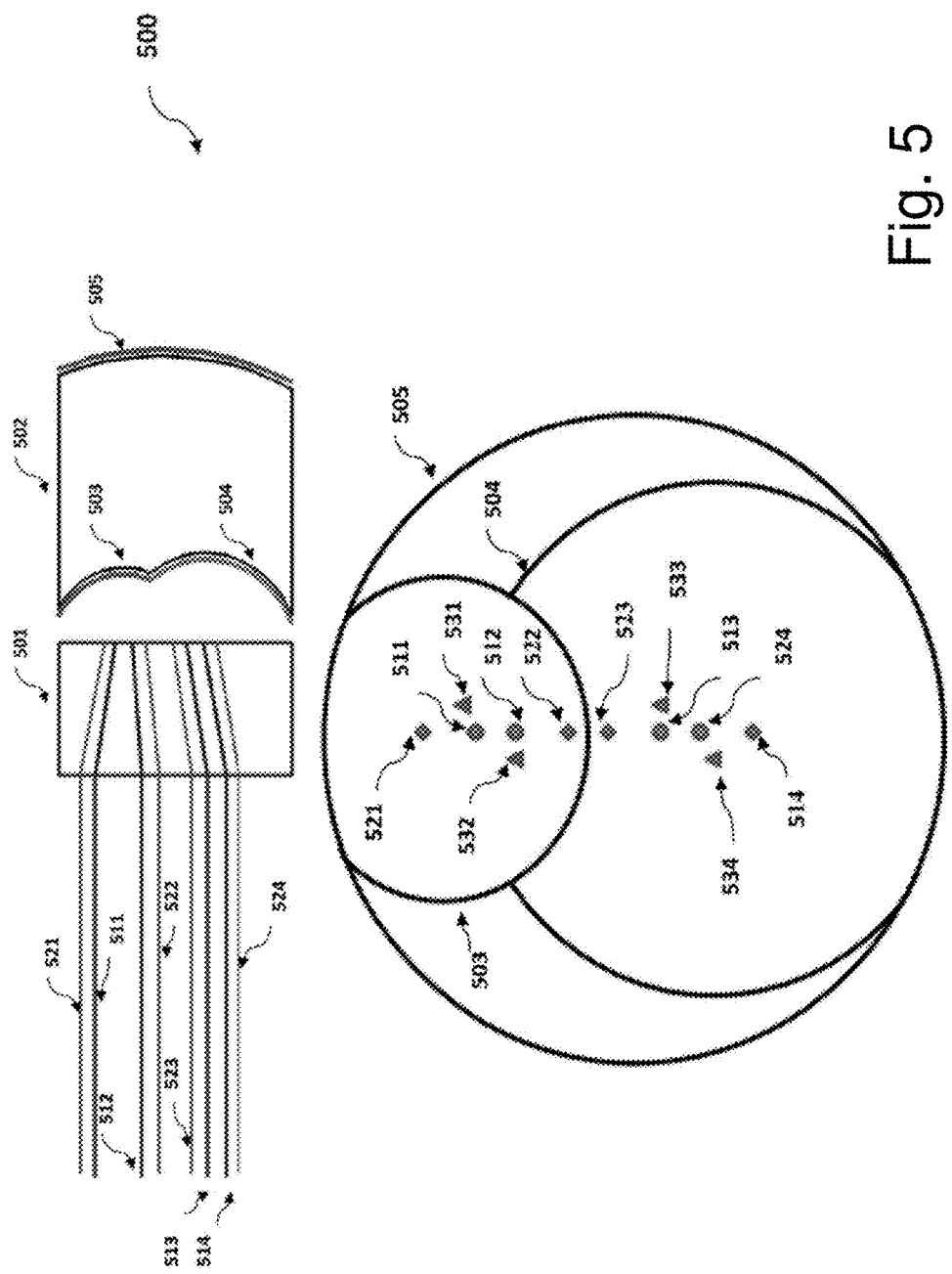
FIG. 5 is a diagram showing the configuration of a compact power splitter supporting multiple sets of 2×2 splitters. Also shown is the end view of multiple sets of launch ports, receiving ports, and isolation ports.
Figure 6:
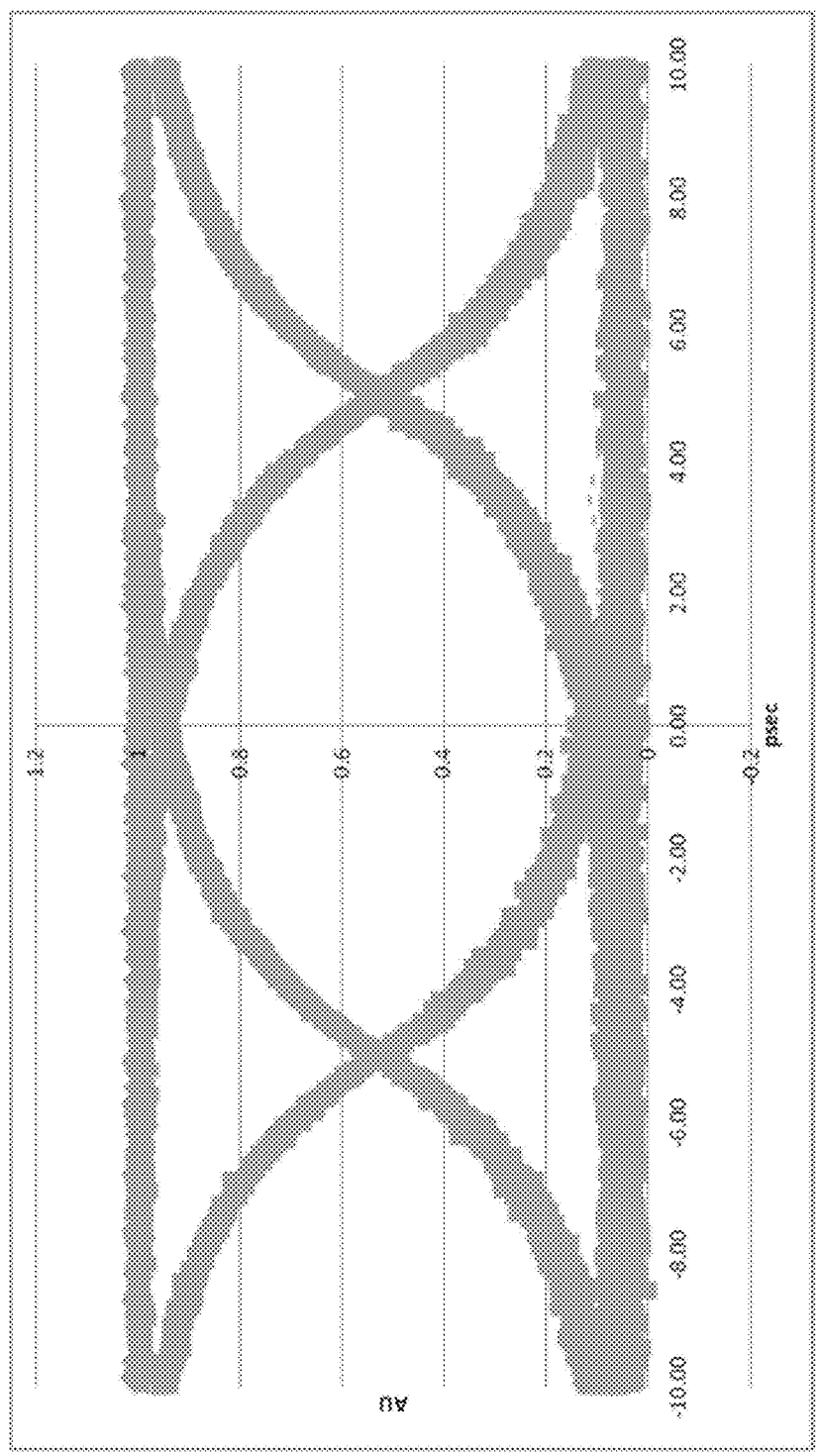
FIG. 6 shows the calculated results of a compact optical power splitter; an open eye diagram at 100 Gbps is observed in a Monte-Carlo analysis.

In Embodiment 3, referring to FIG. 5, an optical power splitter includes a fiber array element 501 and an optical lens element 502. The fiber array element 501 shown in FIG. 5 (top) includes two sets of four optical ports 511, 512, 513, 514, and 521, 522, 523, 524 and the optical lens element 502 includes three functional means 503, 504, 505 where 503 is a partial reflector, 504 is anti-reflecting surface, and 505 is a total reflector. Embodiment 3 differs from Embodiment 2 in the sets of 2×2 optical splitters realized in the embodiment. The top figure shows two sets of 2×2 optical power splitters realized in one optical assembly, the first set of 2×2 splitters consists of four ports 511, 512, 513, 514; while the second set of 2×2 splitters consists of four ports 521, 522, 523, 524. Both sets are configured in the same one-dimensional fiber array. The bottom figure shows the end view of the other configuration where a two-dimensional fiber array 501 together with a lens element 502 realize three sets of 2×2 optical power splitters in one optical assembly. With either fiber array configuration, even more sets of 2×2 optical power splitters can be realized in a single optical assembly.

Highlights of Features

In view of the above, certain features of various embodiments in accordance with the present disclosure are highlighted below.

According to the present disclosure, an optical power splitter may include a multiport optical fiber array and a multi-surface optical element. The multiport optical fiber array may launch and accept optical beams. The multi-surface optical element may include a first surface with partial reflecting coating, a second surface with total reflecting coating, and a third surface with anti-reflecting coating. Upon launching an optical beam from a first port of a plurality of fiber ports via the fiber array, the first surface may split the beam into a transmitted beam and a reflected beam with a splitting ratio determined by the partial reflective coating. One beam, which may be the transmitted beam or the reflected beam, may be received by a second port of the plurality of fiber ports in the fiber array while the other beam, which may be the reflected beam or the transmitted beam, traverses through the second surface and the third surface to be received by a third port of the plurality of fiber ports in the fiber array. Both the transmitted beam and the reflected beam may be received with low modal dependent loss and low modal dependent timing jitter.

In some embodiments, the multiport optical fiber array may include three fiber ports, and the three fiber ports together with the multi-surface optical element may form a 1×2 optical power splitter.

In some embodiments, the multiport optical fiber array may include four fiber ports, and the four fiber ports together with the multi-surface optical element may form a 2×2 optical power splitter.

In some embodiments, the multiport optical fiber array may be two-dimensional and may include multiple sets of three-fiber ports. The multiple sets of three-fiber ports together with the multi-surface optical element may form an optical power splitter with multiple sets of 1×2 splitters.

In some embodiments, the multiport optical fiber array may be two-dimensional and may include multiple sets of four-fiber ports. The multiple sets of four-fiber ports together with the multi-surface optical element may form an optical power splitter with multiple sets of 2×2 splitters.

In some embodiments, a position and an orientation of each port may be determined by a central line of beam propagation when the optical beam is launched from a corresponding input port.

In some embodiments, the first, second and third surfaces may be configured in a manner such that they do not share a same optical axis.

In some embodiments, the multiport optical fiber array may include a planar lightwave circuit.

In some embodiments, the multiport optical fiber array may include a fiber array on a glass substrate.

In some embodiments, the multiport optical fiber array may include a fiber array on a semiconductor substrate.

In some embodiments, the first, second and third surfaces may include spherical surfaces.

In some embodiments, the first, second and third surfaces may include aspherical surfaces.

In some embodiments, the first, second and third surfaces may include digital optical surfaces.

In some embodiments, the multi-surface optical element may include grinding optics, polishing optics, or a combination thereof.

In some embodiments, the multi-surface optical element may include molded optics.

In some embodiments, the partial reflecting coating may include a neutral density coating.

In some embodiments, the partial reflecting coating may include a dielectric coating.

In some embodiments, the total reflecting coating may include a neutral density coating.

In some embodiments, the total reflecting coating may include a dielectric coating.

In some embodiments, the anti-reflecting coating may include a dielectric coating.

Additional Notes

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. An optical power splitter, comprising:
   a multiport optical fiber array which launches and accepts optical beams; and
   a multi-surface optical element comprising a first surface with partial reflecting coating, a second surface with total reflecting coating, and a third surface with anti-reflecting coating,
   wherein, upon launching an optical beam from a first port of a plurality of fiber ports via the fiber array, the first surface splits the beam into a transmitted beam and a reflected beam with a splitting ratio determined by the partial reflective coating,
   wherein one of the transmitted beam and the reflected beam is received by a second port of the plurality of fiber ports in the fiber array while the other of the transmitted beam and the reflected beam traverses through the second surface and the third surface to be received by a third port of the plurality of fiber ports in the fiber array, and
   wherein both the transmitted beam and the reflected beam are received with low modal dependent loss and low modal dependent timing jitter.

2. The optical power splitter of claim 1, where the multiport optical fiber array comprises three fiber ports, and wherein the three fiber ports together with the multi-surface optical element form a 1×2 optical power splitter.

3. The optical power splitter of claim 1, where the multiport optical fiber array comprises four fiber ports, and wherein the four fiber ports together with the multi-surface optical element form a 2×2 optical power splitter.

4. The optical power splitter of claim 1, where the multiport optical fiber array comprises multiple sets of three-fiber ports, and wherein the multiple sets of three-fiber ports together with the multi-surface optical element form an optical power splitter with multiple sets of 1×2 splitters.

5. The optical power splitter of claim 1, where the multiport optical fiber array comprises multiple sets of four-fiber ports, and wherein the multiple sets of four-fiber ports together with the multi-surface optical element form an optical power splitter with multiple sets of 2×2 splitters.

6. The optical power splitter of claim 1, wherein a position and an orientation of each port is determined by a central line of beam propagation when the optical beam is launched from a corresponding input port.

7. The optical power splitter of claim 1, wherein the first, second and third surfaces are configured in a manner such that they do not share a same optical axis.

8. The optical power splitter of claim 1, wherein the multiport optical fiber array comprises a planar lightwave circuit.

9. The optical power splitter of claim 1, wherein the multiport optical fiber array comprises a fiber array on a glass substrate.

10. The optical power splitter of claim 1, wherein the multiport optical fiber array comprises a fiber array on a semiconductor substrate.

11. The optical power splitter of claim 1, wherein the first, second and third surfaces comprise spherical surfaces.

12. The optical power splitter of claim 1, wherein the first, second and third surfaces comprise aspherical surfaces.

13. The optical power splitter of claim 1, wherein the first, second and third surfaces comprise digital optical surfaces.

14. The optical power splitter of claim 1, wherein the multi-surface optical element comprises grinding optics, polishing optics, or a combination thereof.

15. The optical power splitter of claim 1, wherein the multi-surface optical element comprises molded optics.

16. The optical power splitter of claim 1, wherein the partial reflecting coating comprises a neutral density coating.

17. The optical power splitter of claim 1, wherein the partial reflecting coating comprises a dielectric coating.

18. The optical power splitter of claim 1, wherein the total reflecting coating comprises a neutral density coating.

19. The optical power splitter of claim 1, wherein the total reflecting coating comprises a dielectric coating.

20. The optical power splitter of claim 1, wherein the anti-reflecting coating comprises a dielectric coating.

* * * * *